Sept. 22, 1959   H. D. FORREST ET AL   2,904,896
ROTARY DRYER FOR RESINS
Filed Jan. 31, 1957
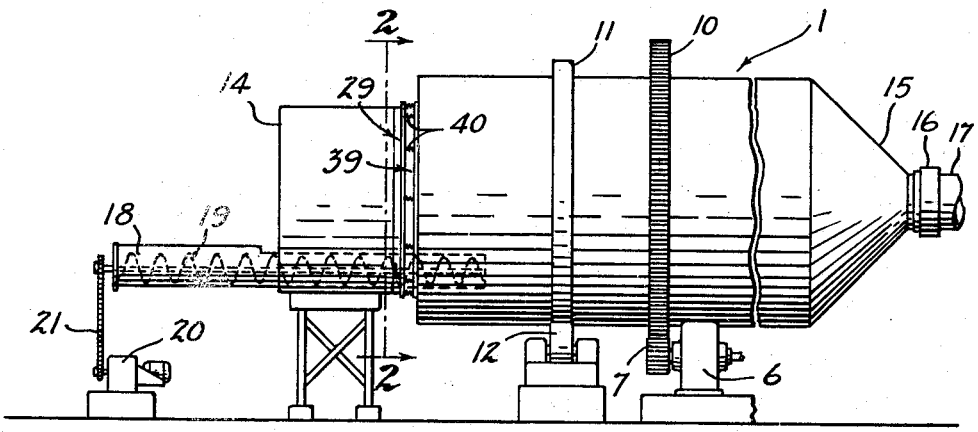
Fig. 1
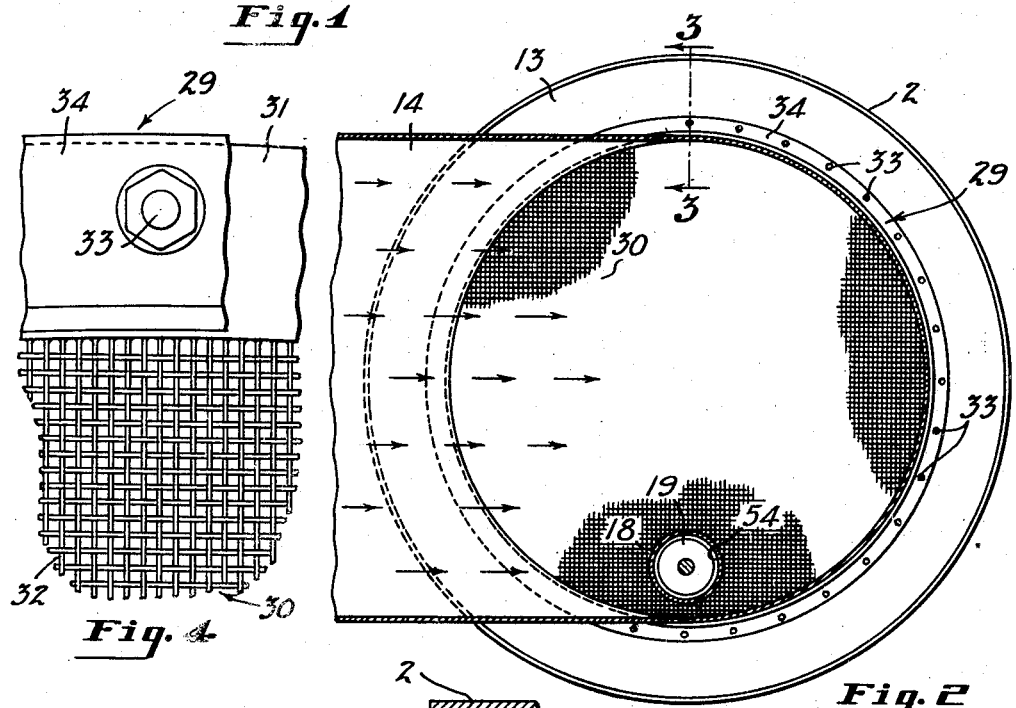
Fig. 4
Fig. 2
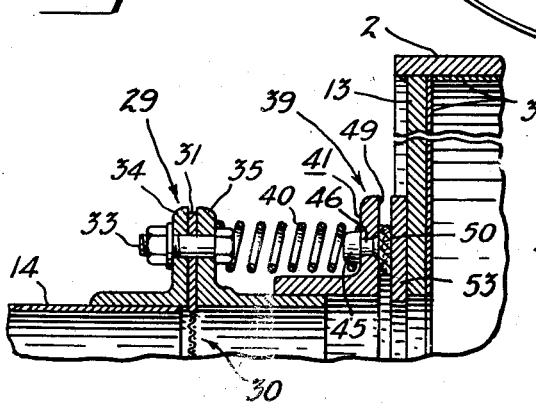
Fig. 3
INVENTORS
Harry D. Forrest
Donald R. Murray
BY McCoy, Greene & Te Grotenhuis
ATTORNEYS

United States Patent Office 2,904,896
Patented Sept. 22, 1959

2,904,896
ROTARY DRYER FOR RESINS

Harry D. Forrest and Donald R. Murray, Ashtabula, Ohio, assignors to The General Tire & Rubber Company, Akron, Ohio, a corporation of Ohio Application January 31, 1957, Serial No. 637,537

4 Claims. (Cl. 34—57)

This invention relates to rotary dryers for drying wet powder materials such as polyvinyl chloride polymers. Polyvinyl chloride has been well suited for drying by a suspension drying system because the polymer particles are generally free flowing and are easily fed into a rotary dryer even when containing as much as 20% to 30% by weight of water. In the suspension drying system, moist polyvinyl chloride is fed into one end of a rotary dryer concurrently with hot air which is blown into the same end of the dryer.

The polyvinyl chloride particles are tumbled by fins of the dryer and picked up by the air stream so as to be carried out of the exit end of the dryer by the air stream and subsequently deposited in a product collector by means of conduit pipes. In this system, a stainless steel air distribution plate having a multiplicity of holes to act as orifices for equal air distribution throughout the interior of the dryer was used at the inlet or feed end of the dryer. A serious disadvantage of this air distribution plate was the fact that eddy currents were set up behind the plate and moist polyvinyl chloride particles adhered to the back side of the plate. The particles on the plate become adhered and deteriorated by the stream of hot air passing through the orifices of the plate. Thus it has been necessary to shut down the dryer frequently so as to clean the plate in order to prevent contaminating the finished product with the adhered particles.

It is an object of the present invention to provide air distributing means for a rotary dryer to provide equal air distribution to all parts of the dryer.

It is also an object of the present invention to provide air distributing means that will minimize contamination of the product by particles which are adhered to the distributing means.

Other objects, uses and advantages of the present invention will become apparent to those skilled in the art from the following description and claims and from the drawings in which:

Figure 1 is a fragmentary side elevational view of a dryer embodying the present invention;

Figure 2 is a fragmentary end view of the air distributing means of the present invention taken on the line indicated at 2—2 in Fig. 1 and drawn on an enlarged scale;

Figure 3 is a fragmentary side elevational view with parts broken away and shown in section, taken on the line indicated at 3—3 in Fig. 2 and on an enlarged scale;

Figure 4 is a fragmentary end view showing the air distributing means of the present invention on an enlarged scale.

Referring more particularly to the drawings, Fig. 1 shows a cylindrical stainless steel dryer 1, comprising a cylindrical steel shell 2 which is preferably provided with a liner 3 of corrosion resistant metal such as stainless steel. The shell 2 is rotatably driven by a driving means comprising a speed reducer 6 driven by motor means not shown and a driving gear 7 which rotates the ring gear 10 that is rigidly mounted on the outside of the dryer shell 2. A bearing ring 11, mounted on the outer periphery of dryer shell 2, rides on suitable rollers 12.

The dryer, as previously mentioned, is a part of a closed circuit system, in which hot air is supplied by a blower, or other means of supplying air under pressure, not shown, which delivers air to the entrance end 13 of the dryer 1, by means of an air duct 14. The air is blown through the dryer so that it collects resin particles and thereafter departs from the exit end 15 of the dryer with the air-borne product. The dried resin particles are carried through an air seal 16 into an exit conduit 17. The air seal allows the dryer to rotate without substantial loss of air while the exit conduit remains stationary. The particles are thereafter collected in a product collector, not shown herein, which is part of the closed circuit system.

The moist resin particles are fed into the entrance end 13 of the dryer by feeding means comprising a screw conveyor housing 18 and a rotatable conveyor screw 19, which is driven by a feed driving means comprising a motor-driven speed reduction unit 20 and chain 21.

As best shown in Figs. 2 and 3, an air distributing means 29 comprising a stainless steel screen 30 and an outer peripheral retainer ring 31 is used to distribute the incoming hot air properly throughout the interior of the dryer. The screen 30 is preferably formed of relatively thin diameter wires 32 which are rigidly attached to the retainer ring by means such as welding or brazing and mounted adjacent to the entrance end 13 of the dryer by mounting means comprising a series of bolts 33 which secure the ring 31 between two annular steel flanged rings 34 and 35, which have diameters substantially of about the same size as the annular retaining ring 31. An air seal assembly 39 maintains an air seal between the screen mounting means and the entrance end of the dryer by means of a series of steel coil springs 40 which exert pressure on an annular angle member 41 in a direction from the retainer ring 31 toward the entrance end of the dryer. The spring is guided and held in place at one end by the heads of bolts 33 and on the other end by a head 45 of a stud 46 which is inserted through angle member 41 by means of a series of circular openings which are provided thereon on the flange 49 of angle member 41 aligned with the bolt head of retainer ring 31.

An annular felt ring 50 is secured to the flange 49 of the annular angle member 41 so as to provide a sliding frictional contact between the felt ring and a metal annular ring 53 which is rigidly mounted on the entrance end 13 of the dryer so that the ring 53 rotates as the dryer is rotated.

A frictional contact is also maintained between the flange ring 35 and the angle member 41 so that a tight contact may be obtained even though the length of spring 40 may be changed during the operation and rotation of the dryer.

As best shown in Fig. 2, the screen 30 is provided with an opening 54 through which the screw conveyor housing 18 is inserted so as to deliver wet resin particles into the interior of the dryer at its entrance end.

The present invention provides an improved air distributing means for incoming hot air at the entrance end of a rotary dryer comprising a corrosion resistant metal screen 30 which distributes the hot air evenly throughout the dryer without contamination of the product due to adhered material. We have discovered that the air distributing means should have (1) a restricting means to cause enough of a pressure drop so as to obtain at least some distribution of hot air through all sections of the drier; (2) a maximum number of openings or orifices so as to obtain an even distribution of air; and, (3) a minimum of area between the orifices to provide the least area for resin particle build-up, and also to lessen formation of eddy currents. The air distributing means of the present invention surprisingly has excellent pressure drop characteristics as well as the other characteristics such as maximum number of openings and minimum of area between the openings. The pressure drop preferably should be equivalent to about ⅛ inch of water with an air velocity of 900' per minute.

While the above conditions are preferred, other operating conditions such as a pressure drop of ½" with an air velocity of 900' to 2000' per minute also may be used. On the other hand, a pressure drop of as low as ¹⁄₁₆" with a corresponding decrease in air velocity, to a velocity in the order of 500' to 800' per minute, also may be used although when lower air velocities are used the air may not be sufficiently distributed or may not be of a sufficient velocity to pick up all the moist particles. When the larger air velocities are used, caution must be exercised to make certain that the pressure drop is enough so that the particles are swirled adequately and air borne long enough to become substantially dried.

The screen preferably has openings from about ⅛" square to about ¼" square, such as represented by U.S. Sieve Series Nos. 3 to 7, which have sieve openings of .111" to .265" respectively. These U.S. Sieve Series sizes 3 to 7 represent the preferred size of the screen. The wires 32 employed in the screen preferably have approximate wire diameters of .036 to .06 and the screens themselves have about 6.8 to 3.57 meshes per linear inch respectively. Screens with up to ⅛" openings may be used although the pressure drop caused by larger than about ½" openings is not enough to provide sufficient pressure drop to give a good distribution of air. Depending upon the size of the particles being dried, as fine a screen as one with ¹⁄₁₆" openings, such as a No. 12, U.S. Sieve Series, U.S. Bureau of Standards, Standard Screen Series 1919, may be used to obtain benefits of the present invention. Screens with openings less than ¹⁄₃₀" or finer than Sieve No. 20, U.S. Screen Series, are generally not satisfactory for moist polyvinyl particles and the like can build up on the screen because of the very fine openings and inferior drying results. The metal of the screen preferably is stainless steel or other corrosion resistant metal to insure a relatively pure, non-contaminated product. The material for the wire may also be a corrosion resistant, relatively heat resistant material such as a fiber glass strand coated and reinforced with a relatively high heat resistant plastic resin such as phenol-formaldehyde or silicone resins, especially when the moisture can be removed by air at a lower temperature than ordinarily employed, which is generally about 140° F. to 250° F.

Any resinous material which is relatively free-flowing when moist, and fine and light enough to be air borne may be used in place of the polyvinyl chloride in the drying operation. Those polymers particularly suited are polyvinyl chloride, polyvinylidene chloride, vinyl acetate, vinyl chloride-vinyl acetate copolymers, vinyl chloride-vinylidene chloride copolymers, and mixtures of the above.

It is to be understood that in accordance with the provisions of the patent statutes, this invention is not limited to the particular form of product shown and described herein, and the particular procedure set forth is presented for purposes of explanation and illustration, and that various modifications of said patent and procedure can be made without departing from our invention.

What we claim is:

1. A rotary dryer for removing moisture from resin particles and the like, having feed and discharge ends, said dryer having air carrying conduits at said feed and discharge ends which cover substantially all the area of the dryer at said ends, means for feeding moist resin at the feed end and air distribution means at the feed end comprising a screen having stainless steel wires which form a plurality of openings, each of said openings having an area of at least about ¹⁄₆₀₀ square inch and an area no greater than about ¼ square inch.

2. In a closed circuit forced air circulating system for removing moisture from resin and similar fine particles having a rotary drier with an entrance end and exit end and having a product collector, a conduit for conducting hot air from a blower to said entrance end of the dryer and a conduit to carry air and dried particles away from said exit end to said product collector, means for feeding moist resin at said entrance end, and air distribution means for hot air located at the entrance end of the dryer comprising a wire screen made of corrosion resistant metal wires spaced apart about ¹⁄₃₀" to about ½".

3. In a closed circuit forced air circulating system for removing moisture from resin and similar fine particles having a rotary drier with entrance and exit ends and a product collector, a conduit for conducting hot air to carry air and dried particles away from said exit and to said product collector, means for feeding moist resin adjacent said entrance end, and air distribution means for hot air located at the entrance end of the dryer comprising a screen made of wires of a corrosion resistant material spaced apart about ¹⁄₃₀" to about ½".

4. In a substantially closed circuit air drying system for removing moisture from resin and similar fine particles having a rotary dryer with a conduit at its entrance end for conducting hot air from a blower into the interior of said dryer and an exit conduit to conduct dried particles from said dryer to a product collector, means for feeding moist resin at said entrance end, and air distribution means for hot air at the entrance end of the dryer comprising a screen made of relatively corrosion resistant material with a plurality of openings, each of said openings having an area at least of about ¹⁄₆₀₀ square inch and no greater than about ¼ square inch.

References Cited in the file of this patent

UNITED STATES PATENTS

| 1,293,780 | Hornsey | Feb. 11, 1919 |
| 1,294,547 | Sinclair | Feb. 18, 1919 |

FOREIGN PATENTS

| 438,728 | Germany | Dec. 27, 1926 |
| 465,148 | Canada | May 16, 1950 |